US012252929B2

(12) United States Patent
Pellegrini

(10) Patent No.: US 12,252,929 B2
(45) Date of Patent: Mar. 18, 2025

(54) MANUFACTURED DOOR

(71) Applicant: INTER-GLOBAL EXHIBITIONS, Inc., Englewood, CO (US)

(72) Inventor: Gino Pellegrini, Englewood, CO (US)

(73) Assignee: Inter-Global Exhibitions, Inc., Englewood, CO (US)

( * ) Notice: Subject to any disclaimer, the term of this patent is extended or adjusted under 35 U.S.C. 154(b) by 0 days.

(21) Appl. No.: 17/652,595

(22) Filed: Feb. 25, 2022

(65) Prior Publication Data

US 2022/0282561 A1 Sep. 8, 2022

Related U.S. Application Data

(60) Provisional application No. 63/200,337, filed on Mar. 2, 2021.

(51) Int. Cl.
*E06B 3/70* (2006.01)
*E06B 3/74* (2006.01)

(52) U.S. Cl.
CPC .............. *E06B 3/7001* (2013.01); *E06B 3/74* (2013.01); *E06B 2003/7051* (2013.01)

(58) Field of Classification Search
CPC .... E06B 3/7001; E06B 3/7003; E06B 3/7015; E06B 3/7017; E06B 3/74; E06B 3/76; E06B 2003/7019; E06B 2003/703; E06B 2003/7046; E06B 2003/7049; E06B 2003/7051; E06B 2003/7053; E06B 2003/7061; E06B 2003/7067; E06B 7/02; E06B 7/08; E06B 3/71017; E06B 2003/7032; E06B 2003/7042; E06B 2003/7021; E06B 2003/7025; E06B 2/08; E06B 2/10; E06B 2/12; E06B 2/24; E06B 2/32; E06B 2/36; E06B 2/365; E06B 2/26; E04C 2/08; E04C 2/10; E04C 2/12; E04C 2/24; E04C 2/32; E04C 2/36; E04C 2/365; E04C 2/26; Y10T 428/24273; B27M 1/04; F24F 13/18
See application file for complete search history.

(56) References Cited

U.S. PATENT DOCUMENTS 1,951,983 A * 3/1934 Kellett ........................ E04C 2/26 428/464
2,538,330 A * 1/1951 Rosenhagen ............. E04C 2/36 428/116
2,883,004 A * 4/1959 Bellino ..................... A47F 1/04 187/251

(Continued)

FOREIGN PATENT DOCUMENTS

GB 2258683 A * 2/1993 ........... E06B 3/7001
GB 2317914 A * 4/1998 ............. E06B 1/045

*Primary Examiner* — Kyle J. Walraed-Sullivan
(74) *Attorney, Agent, or Firm* — Hall Estill Law Firm

(57) ABSTRACT

A manufactured door is disclosed having at least one mid panel having a plurality of openings formed therethrough. In an example, two mid panels are assembled back-to-back with one another. The example manufactured door also includes a front outer panel assembled over the at least one mid panel to form a front door side. A back outer panel is assembled over the at least one mid panel to form a back door side. A door skin is laminated on the front outer panel and the back outer panel for a finished appearance to the manufactured door.

18 Claims, 9 Drawing Sheets

(56) References Cited

U.S. PATENT DOCUMENTS

| | | | | | |
|---|---|---|---|---|---|
| 3,252,259 | A * | 5/1966 | Gerhardt | E06B 5/16 52/302.1 |
| 3,447,803 | A * | 6/1969 | Kucheck | E04C 2/36 428/116 |
| 3,815,312 | A * | 6/1974 | Lench | E06B 5/10 109/82 |
| 4,343,846 | A * | 8/1982 | Kohn | B32B 3/266 428/116 |
| 4,489,121 | A * | 12/1984 | Luckanuck | B32B 21/13 428/326 |
| 4,630,420 | A * | 12/1986 | Hagemeyer | E06B 3/7001 52/796.1 |
| 5,120,273 | A * | 6/1992 | Lin | F24F 13/18 454/212 |
| 5,912,442 | A * | 6/1999 | Nye | B64G 1/22 181/292 |
| 6,739,104 | B2 * | 5/2004 | Tokonabe | F16L 59/065 52/406.1 |
| 8,573,357 | B1 * | 11/2013 | Hibbs | E06B 5/20 181/290 |
| 9,200,480 | B2 * | 12/2015 | Deiler | F41H 5/0471 |
| 9,719,291 | B1 * | 8/2017 | Crittenden | E06B 7/082 |
| 10,190,360 | B1 * | 1/2019 | Crittenden | E06B 5/00 |
| 10,676,984 | B1 * | 6/2020 | Crittenden | E06B 3/7015 |
| 2002/0014051 | A1 * | 2/2002 | Fraval | B28B 3/2636 52/794.1 |
| 2003/0009976 | A1 * | 1/2003 | Hauser | B44C 5/043 52/656.4 |
| 2004/0126537 | A1 * | 7/2004 | Jackson | E04C 2/365 156/290 |
| 2004/0226245 | A1 * | 11/2004 | Clark | E04B 1/942 52/455 |
| 2006/0037714 | A1 * | 2/2006 | Imbra | E06B 9/04 160/90 |
| 2006/0124255 | A1 * | 6/2006 | Manzella | E06B 9/52 160/371 |
| 2007/0113520 | A1 * | 5/2007 | Lynch | B27N 3/08 52/783.1 |
| 2011/0000167 | A1 * | 1/2011 | Dimke | B32B 21/14 156/154 |
| 2014/0000194 | A1 * | 1/2014 | Daniels | E06B 5/164 52/784.11 |
| 2014/0260080 | A1 * | 9/2014 | Swartzmiller | E06B 3/72 156/331.7 |
| 2015/0107172 | A1 * | 4/2015 | Daniels | E06B 3/78 52/232 |
| 2017/0030140 | A1 * | 2/2017 | Nelson | E06B 3/72 |
| 2018/0087315 | A1 * | 3/2018 | Glover | E06B 3/221 |
| 2018/0087879 | A1 * | 3/2018 | Glover | B32B 5/20 |
| 2020/0190801 | A1 * | 6/2020 | Kolcun | B32B 5/26 |
| 2020/0370362 | A1 * | 11/2020 | Moore, Jr. | E06B 3/78 |
| 2021/0381306 | A1 * | 12/2021 | Postavskii | E06B 5/10 |

* cited by examiner

MANUFACTURED DOOR

PRIORITY CLAIM

This application claims the priority filing benefit of U.S. Provisional Patent Application No. 63/200,337 filed Mar. 2, 2021 for "Manufactured Door" of Gino Pelligrini, hereby incorporated by reference in its entirety as though fully set forth herein.

BACKGROUND

Originally, doors were made of wood. Wood is a scarce resource and thus wooden doors are less common today than in the past. A popular alternative to solid wood is Medium Density Fiberboard or MDF. But MDF is very dense, making it very heavy. In addition, MDF is porous and soaks up paint and stain. Because there is no wood grain on MDF, it does not look as attractive as wood when it is painted or stained. Therefore, traditional MDF is not a viable alternative for doors.

DETAILED DESCRIPTION

Figure 1:
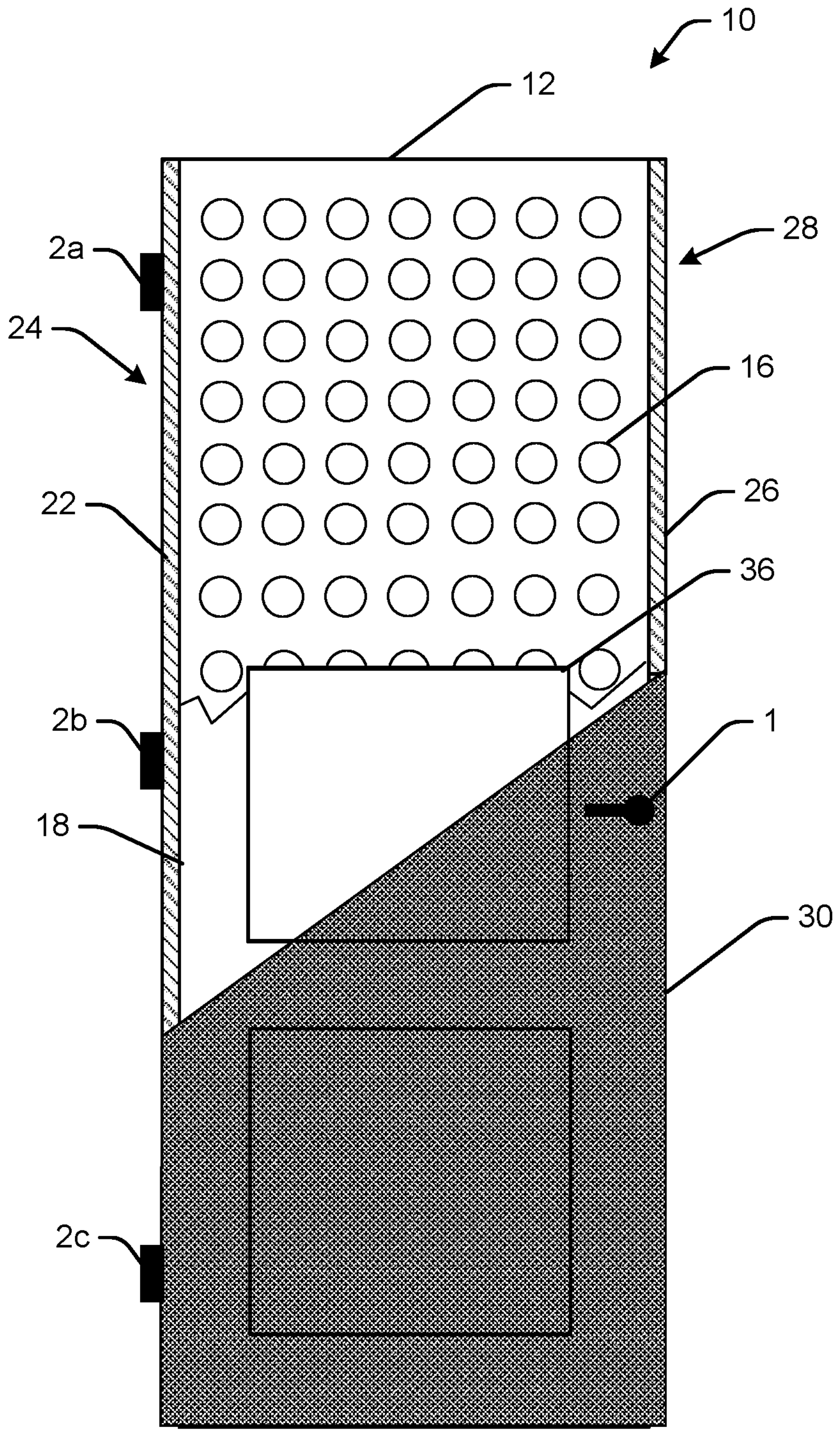
FIG. 1 is a partial cutaway view of an example manufactured door illustrating various components.

A manufactured door is disclosed as it may include at least one mid panel with openings formed therethrough to reduce weight while maintaining structural integrity of the finished door product. In an example, the manufactured door includes a first mid panel and a second mid panel. At least one of the first mid panel and/or the second mid panel has a plurality of openings formed therethrough.

To reduce the weight of the door, the example manufactured door is manufactured by creating lightening holes in the solid mid panel(s). These lightening holes are carefully engineered in the door structure to make the door lighter, while retaining the integrity of a full solid door of similar dimensions.

A front outer panel is assembled over the mid panel(s) to form a front door side, and a back outer panel is assembled over the mid panel(s) to form a back door side. A first structural edge forms a first door edge, and a second structural edge forms a second door edge. The structural edges provide a mounting location for hinges and/or the door handle. The manufactured door is finished by laminating a door skin over the front outer panel and the back outer panel. In an example, the manufactured door can be prefinished with any of a variety of finished appearances.

In an example, at least several of the plurality of openings in the first mid panel align with at least several of the plurality of openings in the second mid panel. In another example, at least several of the plurality of openings in the first mid panel do not align with at least several of the plurality of openings in the second mid panel.

An example manufactured door is manufactured of medium-density fiberboard (MDF) or other suitable material (including but not limited to wood, plastic, metal, etc.). In an example, the manufactured door weighs less than a similar door made of solid MDF (e.g., the weight of a 80"×32" door is about 60 pounds).

The example manufactured door produced according to the techniques described herein exhibit little or no cracking, have a high-quality finish, reduce sound transmission for increased privacy, do not shrink, and are more stable and durable than comparable traditional solid wood doors. The finishes can include texture details, and show crisp and clean lines.

In an example, the manufactured door can be custom made of MDF routed with a 3DL finish, with engineered components to resist warp. The manufacturing process enables a fast turn-around time to produce doors that are pre-finished and ready to install. The customer can choose from a selection of contemporary designs, finishes and colors, with optional hardware and jambs. The example manufactured door can be sold directly to the tradesman or homeowner. Due to the weight savings, the manufactured door can be shipped cost-effectively nationwide to homes and construction sites.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

FIG. 1 is a partial cutaway view of an example manufactured door 10 illustrating various components. An example manufactured door 10 includes a first mid panel 12 and a second mid panel 14 (see, e.g., top view in FIG. 3). At least one of the first mid panel 12 and the second mid panel 14 have a plurality of openings 16 formed therethrough. In an example, the manufactured door 10 may include a single mid panel. In another example, the manufactured door 10 may include more than two mid panels. The plurality of openings 16 reduce weight of a finished door product while maintaining structural integrity of the finished door product.

In an example, the manufactured door 10 is made from a highly refined MDF and/or low density fiberboard (LDF). MDF and LDF are stable and abundant wood fiber material.

In an example, at least several of the plurality of openings 16 in the first mid panel 12 align with at least several of the plurality of openings 16 in the second mid panel 14. In another example, at least several of the plurality of openings 16 in the first mid panel 12 do not align with at least several of the plurality of openings 16 in the second mid panel 14.

In an example, a front outer panel 18 is assembled over the mid panel(s) 12 and 14 to form a front door side. A back outer panel 20 (see, e.g., top view in FIG. 2) is assembled over the mid panel(s) 12 and 14 to form a back door side.

In an example, a first structural edge 22 forms a first door edge 24, and a second structural edge 26 forms a second door edge 28. The structural edges 22 and 26 provide support for door hardware, such as a door handle 1 and/or hinges 2*a-c*.

Figure 2:
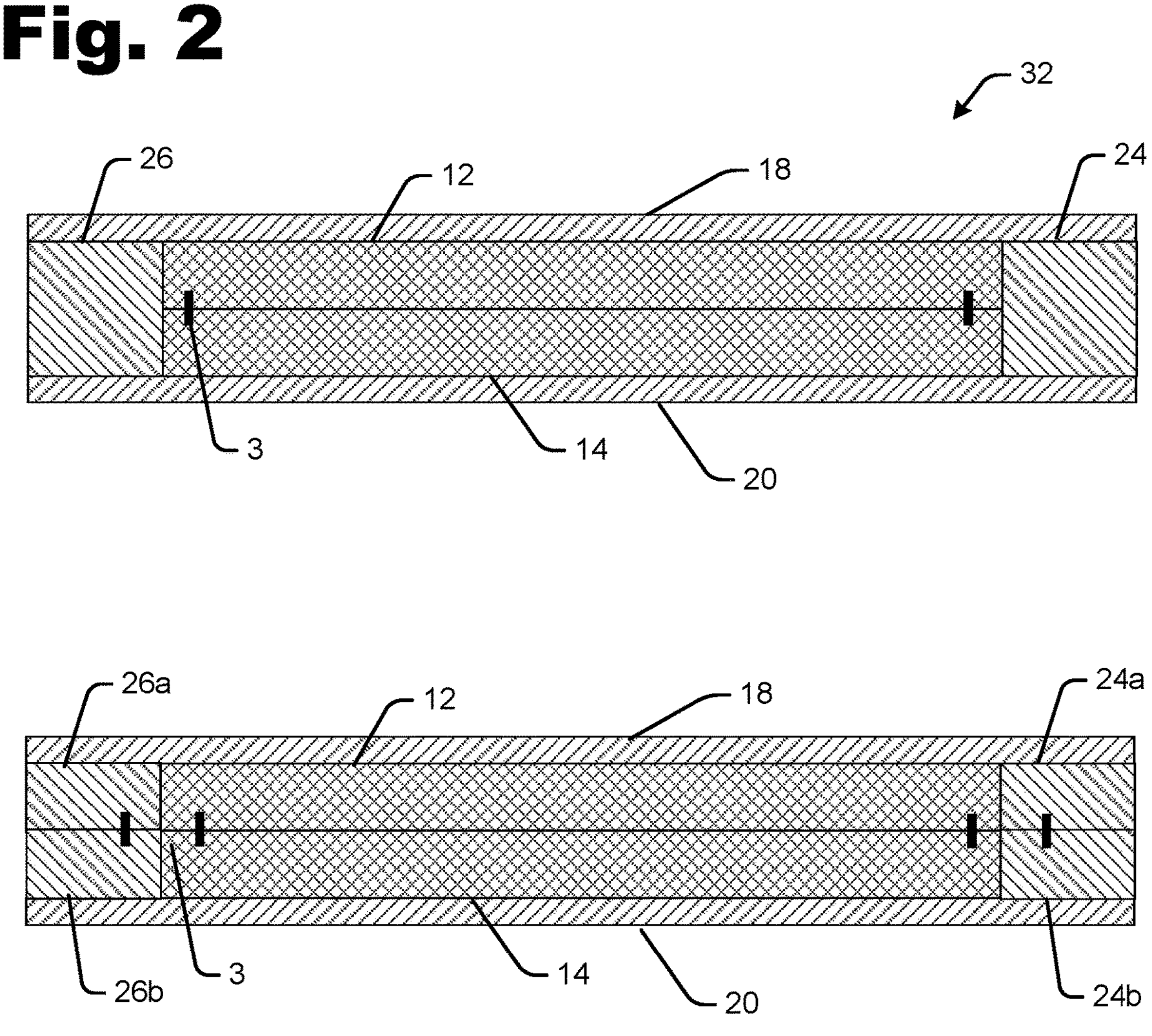
FIG. 2 is a top edge view of the example manufactured door taken along lines 2-2 in FIG. 1.

FIG. 2 are top edge views 32 and 34 of the example manufactured door 10 taken along lines 2-2 in FIG. 1. The top edge view 32 shows an example of the manufactured door 10 having a single edge 24 and 26 on each side. The top edge view 34 shows an example of the manufactured door 10 having double edges 24*a-b* and 26*a-b*. Staples 3 can be seen in FIG. 3 as these may be used to hold the door components together at least temporarily during assembly (e.g., for alignment during gluing).

The manufactured door 10 may be finished with a door skin 30 (e.g., laminated over the front outer panel 18 and the back outer panel 20). In an example, the door skin 30 is a thermally fused foil finish. The door skin 30 may be any suitable finishing product. For example, the door skin 30 may be a Thermofoil or other vinyl.

An example finish is made via 3DL (three dimensional laminate) technology. There are multiple color and finishes options, from wood texture to solid colors and finishes. This blend of materials and technology delivers architecturally-true, ready to install finished doors to fit any interior style.

The finished manufactured door 10 is superior to a standard painted door. The finished manufactured door 10 is much less likely to chip as compared to paint. The door skin 30 is available in solid colors, in addition to wood grain, stone, and metallic appearance finishes. The door skin 30 is made to last. The door skin 30 is more consistent and smoother than a painted door. The door skin 30 is easy to clean using standard household cleaning products. Various finishes are available for the door skin 30 to cater to both budget-conscious shoppers and those looking for a high-end product.

Figure 3:
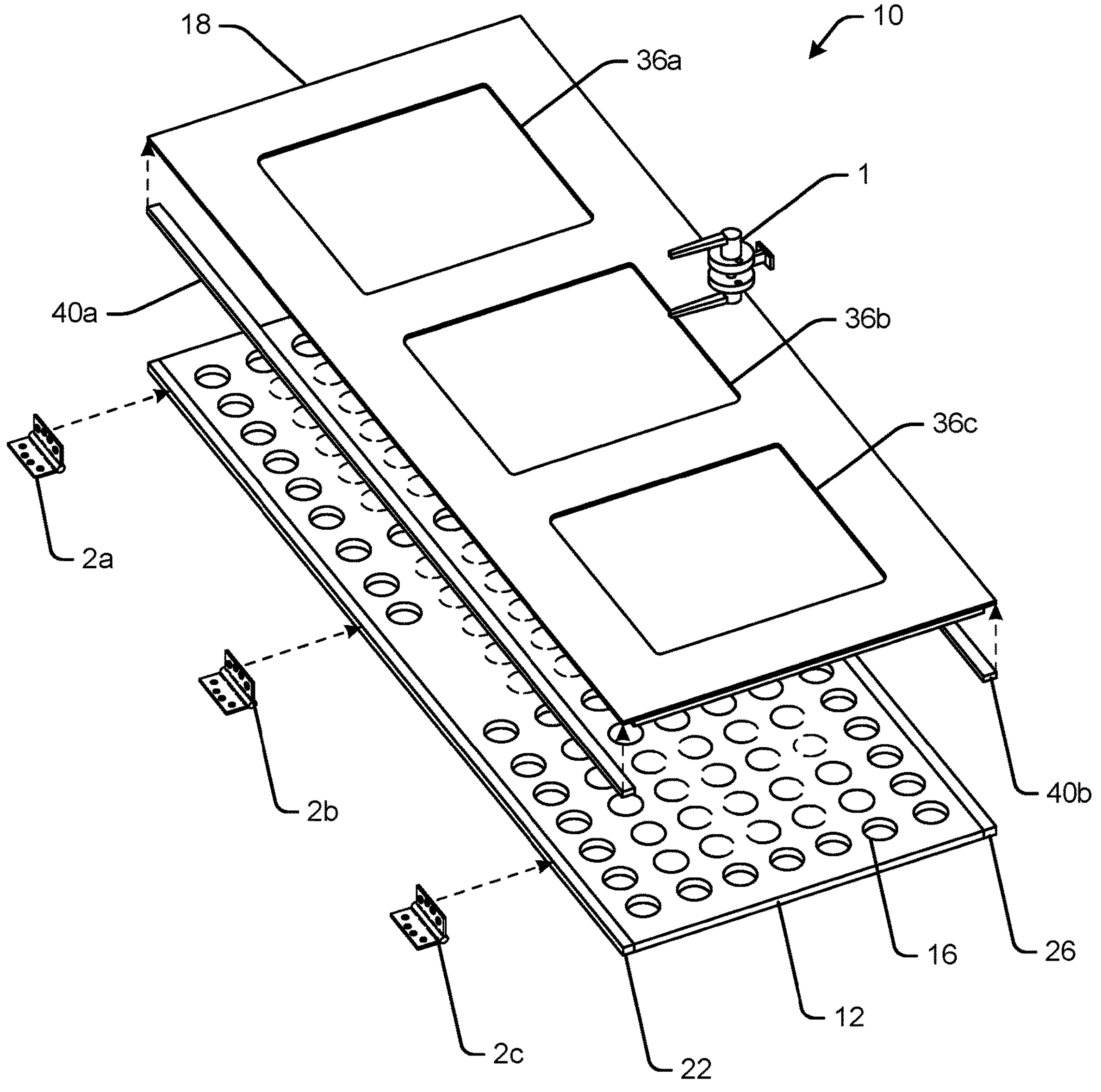
FIG. 3 is an exploded partial view of the example manufactured door illustrating various components.

FIG. 3 is an exploded partial view of the example manufactured door 10 illustrating various components. An example manufactured door 10 includes at least one mid panel 12 and 14 having a plurality of openings 16 formed therethrough. In an example, two mid panels 12 and 14 are provided (e.g., a front and rear mid panel 12 and 14). In another example, more than two mid panels may be provided. The mid panels 12 and 14 may be glued and/or otherwise connected together (e.g., via staples 13 shown in FIG. 3).

In an example, a front outer panel 18 is assembled over the mid pane(s) 12 and 14 to form a front door side. A back outer panel 20 is assembled over the mid panel(s) 12 and 14 to form a back door side. The manufactured door 10 may be finished with a door skin 30 laminated on or over the front outer panel 18 and the back outer panel 20.

The manufactured door 10 may have at least one structural edge. In an example, a first structural edge 22 forms a first door edge 24, and a second structural edge 26 forms a second door edge 28. The structural edges 22 and 26 may be manufactured of solid wood or any other material configured to provide structural support for the manufactured door edges (e.g., for mounting hinges, door handles and/or other door hardware).

In an example, at least one door panel 32 covers at least some of the plurality of openings formed through the at least one mid panel 12 or 14. The door panel(s) 32 may be assembled between an opening 34 formed in the front outer panel 18 or the back outer panel 20 and the at least one mid panel 12 or 14. In an example, the door panel(s) 32 may be solid panel(s).

Figure 4:
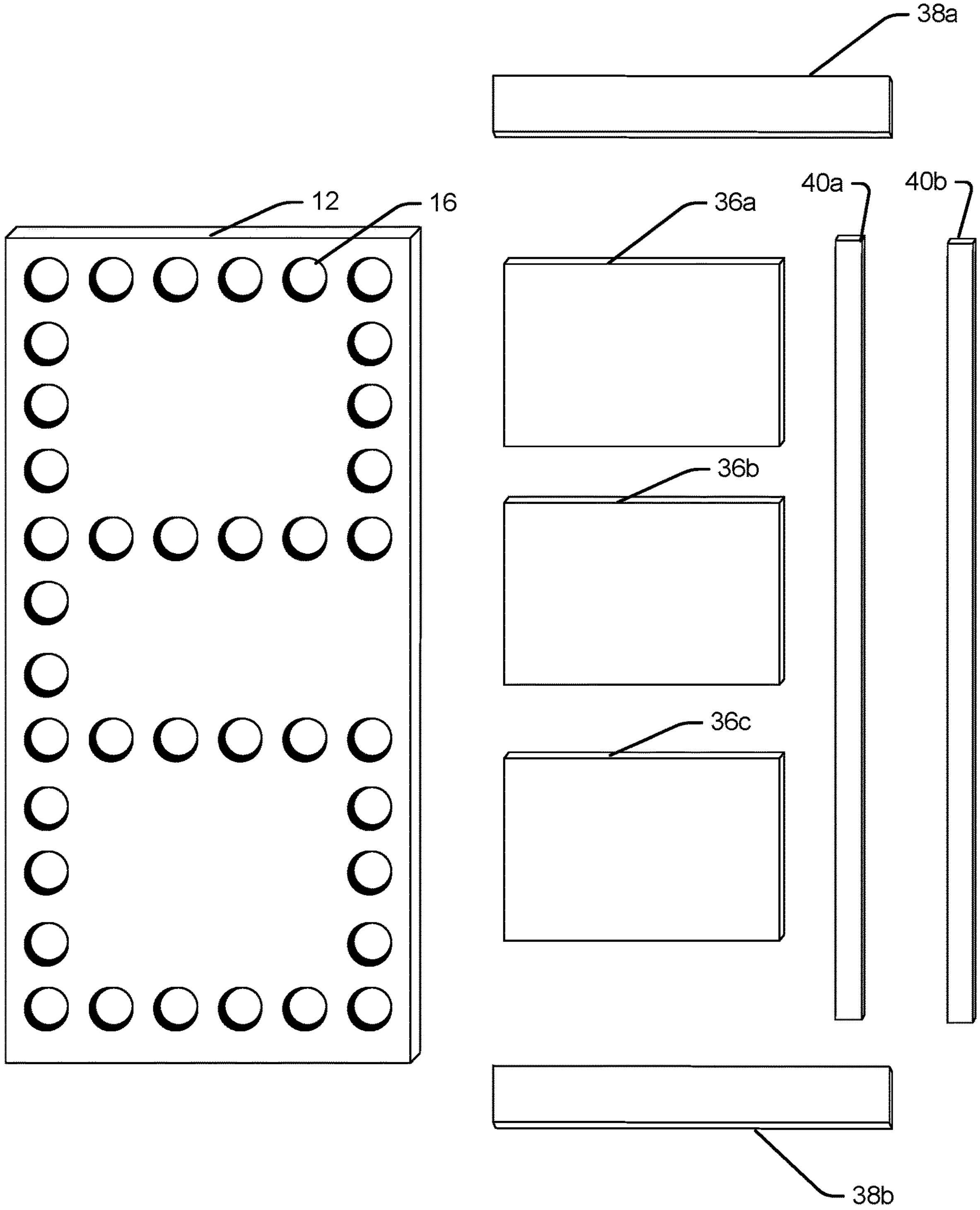
FIGS. 4-7 illustrate assembly of the example manufactured door 10.

In an example, the plurality of openings 16 formed through at least one mid panel 12, 14 form a pattern (see, e.g., FIG. 4). The pattern may be provided to provide additional structural support (e.g., for panels and/or door hardware), while maintaining an overall desired weight of the finished door product. For example, there may be no openings formed through one or more of the mid panel(s) within a predetermined surface area designated to mount a door handle, as seen in FIG. 4. Other patterns may also be provided, e.g., for sound deadening or other desired characteristics of the finished door product.

In an example, the manufactured door 10 may have unique shapes and/or finishes. For example, different types of door panels (solid, multi-paneled, square panels, rounded top, etc.). Regardless of the underlying door shape, a thermally fused foil finish enables the door to have soft, seamless edges that do not trap dirt or bacteria, are durable, and feature a "cleaner" look (e.g., as a single component finish). The manufactured door 1 is easy to clean and maintain. The thermally fused foil finish is cost-effective for manufacturing, and can even have the appearance of natural wood without the added cost of real wood. The manufactured door 10 can be made available in a wide variety of styles, e.g., from classic to contemporary. Many rich, textured colors may also be available to the consumer.

In an example, the manufactured door includes hinges 2*a-c* that are no-mortise. No-mortise hinges 2*a-c* refers to hardware that does not require cuts in the wood for hinges to be attached. No-mortise hardware is a quick and easy option for installing hinges. No-mortise hinges 2*a-c* do not require cuts to be made in the manufactured door 10 to install the hinges 2*a-c*. No-mortise hinges 2*a-c* are thinner than standard hinges, which limits the gap on the doors. No-mortise hinges 2*a-c* leave only a small space between the adjacent doors or the door and frame. These hinges 2*a-c* may be provided in a variety of profiles and interior mounted varieties. Example no-mortise hinges can be designed specifically for full inlay doors. These hinges may have a leaf that provides extra support by wrapping around the door.

In an example, the manufactured door 10 also enables optional pre-hanging of the doors. A pre-hung door includes a door 10 hung on hinges 2*a-c* and assembled in a MDF, wood, or other material frame (the frame is also called the door "jamb"), with a door stop. Full MDF, hardwood or other inserts and jambs may be provided. For pre-hanging the door 10, the jambs are fully finished in the factory based on the color and finish of choice.

A pre-hung door 10 is ready to install in the door opening, with no on-site assembly required. This reduces construction time (and scheduling) and lowers project cost. Factory pre-hanging ensures that hinge pockets are mortised square and precise, and that hinges are always flush on the door and frame.

Boring and latch/deadbolt mortising may also be provided with factory pre-hanging. This prepares the door 10 for hardware installation. A choice of single or double bore options can be available in different "backset" positions (e.g., the placement of the handle or lockset from the door edge). Factory pre-hanging also ensures that the "reveal" (the small gap between the door and the jamb when the door is closed) is always correct.

In an example, the manufactured door 10 provides a solution to an otherwise heavy MDF door. That is, the manufactured door includes full size MDF panels which can be routed and/or carved to create different designs and shapes and finished using a thermally fused foil finish. This process provides a manufactured door 10 that is extremely simple and fast to produce, less expensive, and has a good quality finish and appearance.

Figure 8:
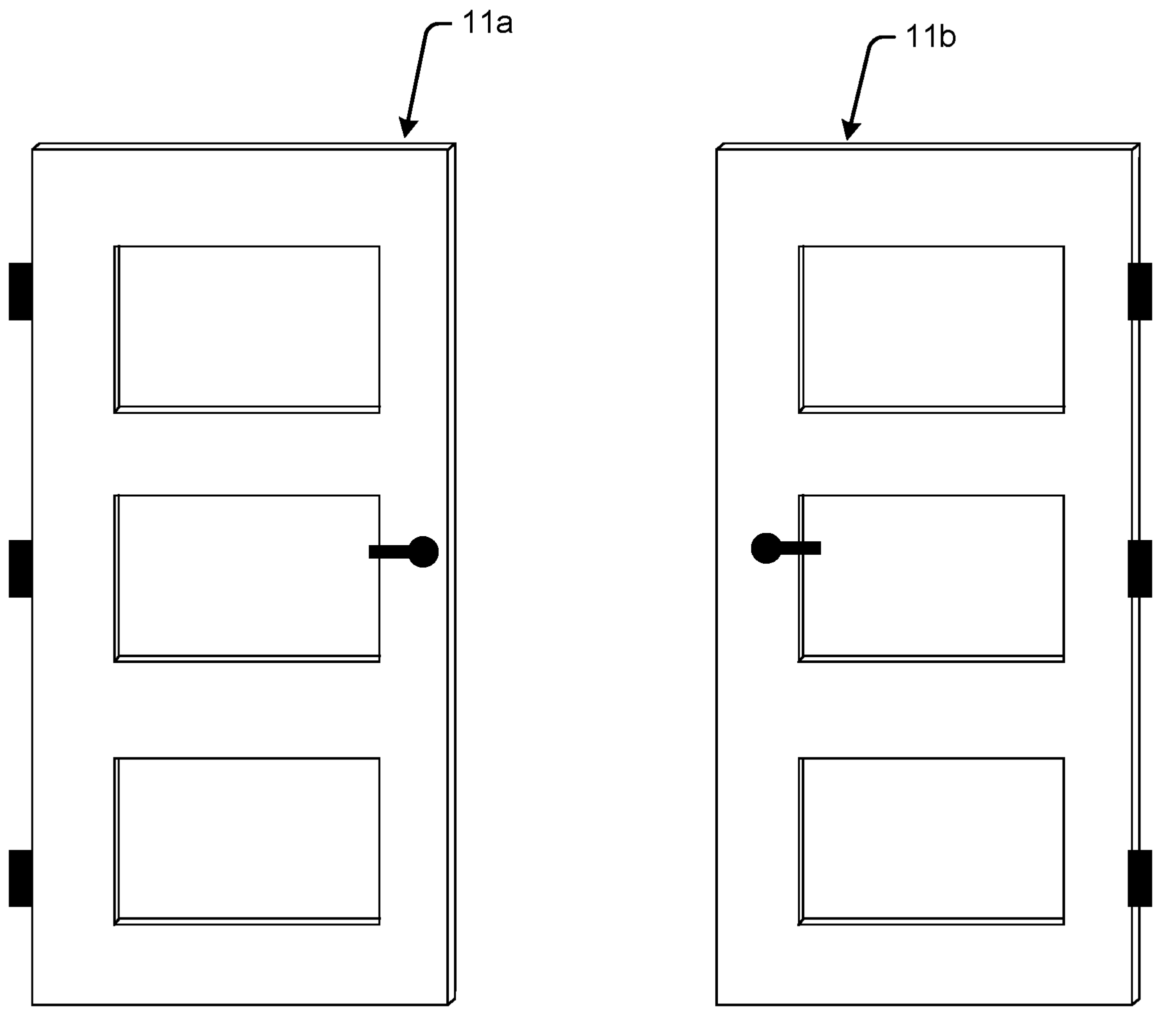
FIG. 8 shows a fully assembled view of the first and second sides of the example manufactured door.

FIGS. 4-7 illustrate assembly of the example manufactured door 10. FIG. 8 shows a fully assembled view of the first and second sides of the example manufactured door 10. The operations shown and described herein are provided to illustrate example implementations. It is noted that the operations are not limited to the ordering shown. Still other operations may also be implemented.

Example operations for producing a manufactured door 10 may include forming a plurality of openings 16 through at least one mid panel 12, 14 to reduce weight of the manufactured door 10. In an example, other areas of the manufactured door remain solid to provide strength for the finished door product.

By way of further illustration, operations may include hollowing LDF boards via CNC Routing. In an example, the LDF board is routed in specific areas to form openings at least partly therethrough to reduce overall weight of the finished door product. Other areas of the LDF boards remain solid, e.g., providing a surface for application of the thermally fused foil finish.

Example operations may also include assembling a front outer panel 18 over the at least one mid panel to form a front door side of the manufactured door 10. Example operations may also include assembling a back outer panel 20 over the at least one mid panel 12, 14 to form a back door side of the manufactured door 10.

Figure 5:
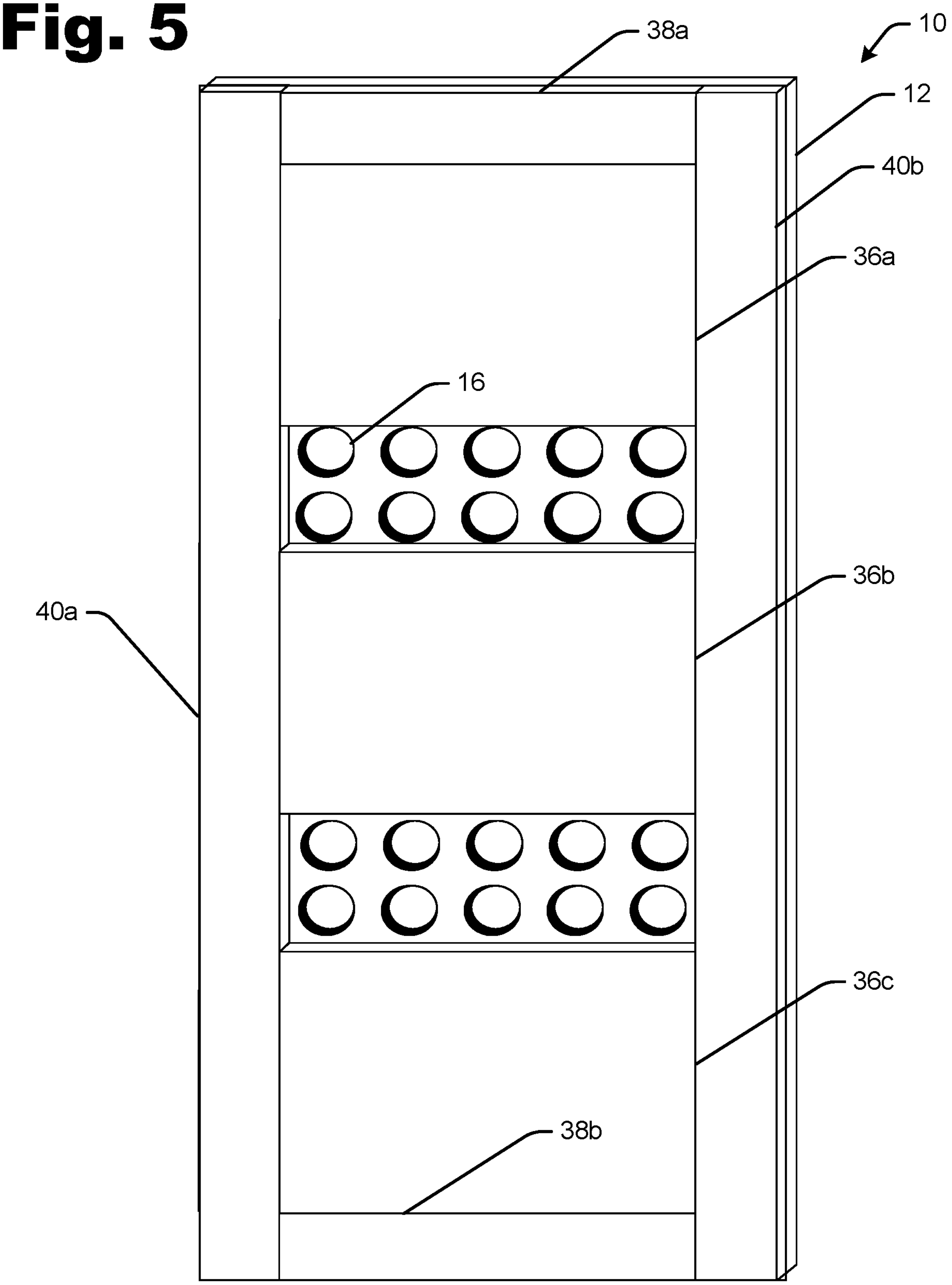
Figure 6:
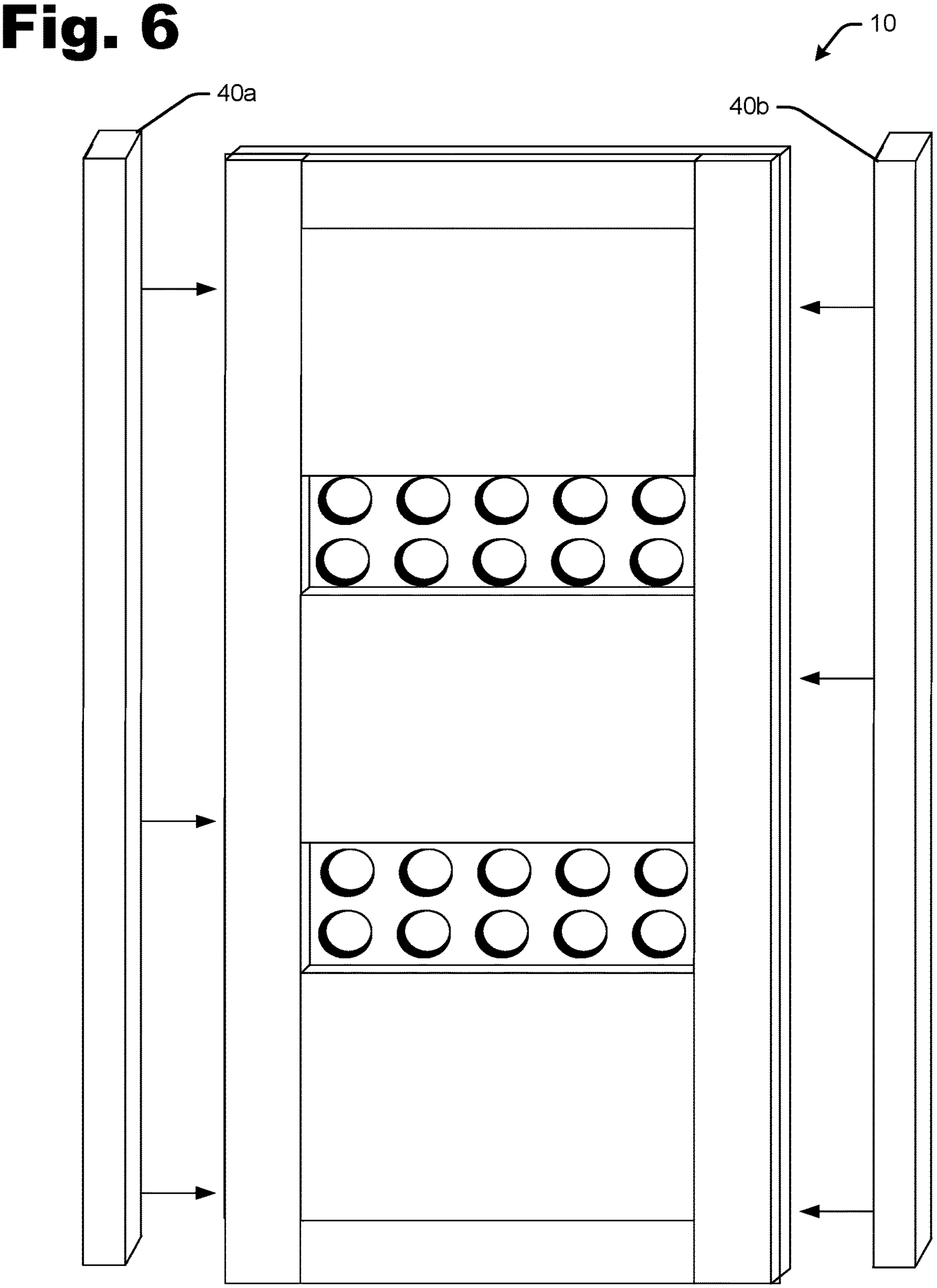
Figure 7:
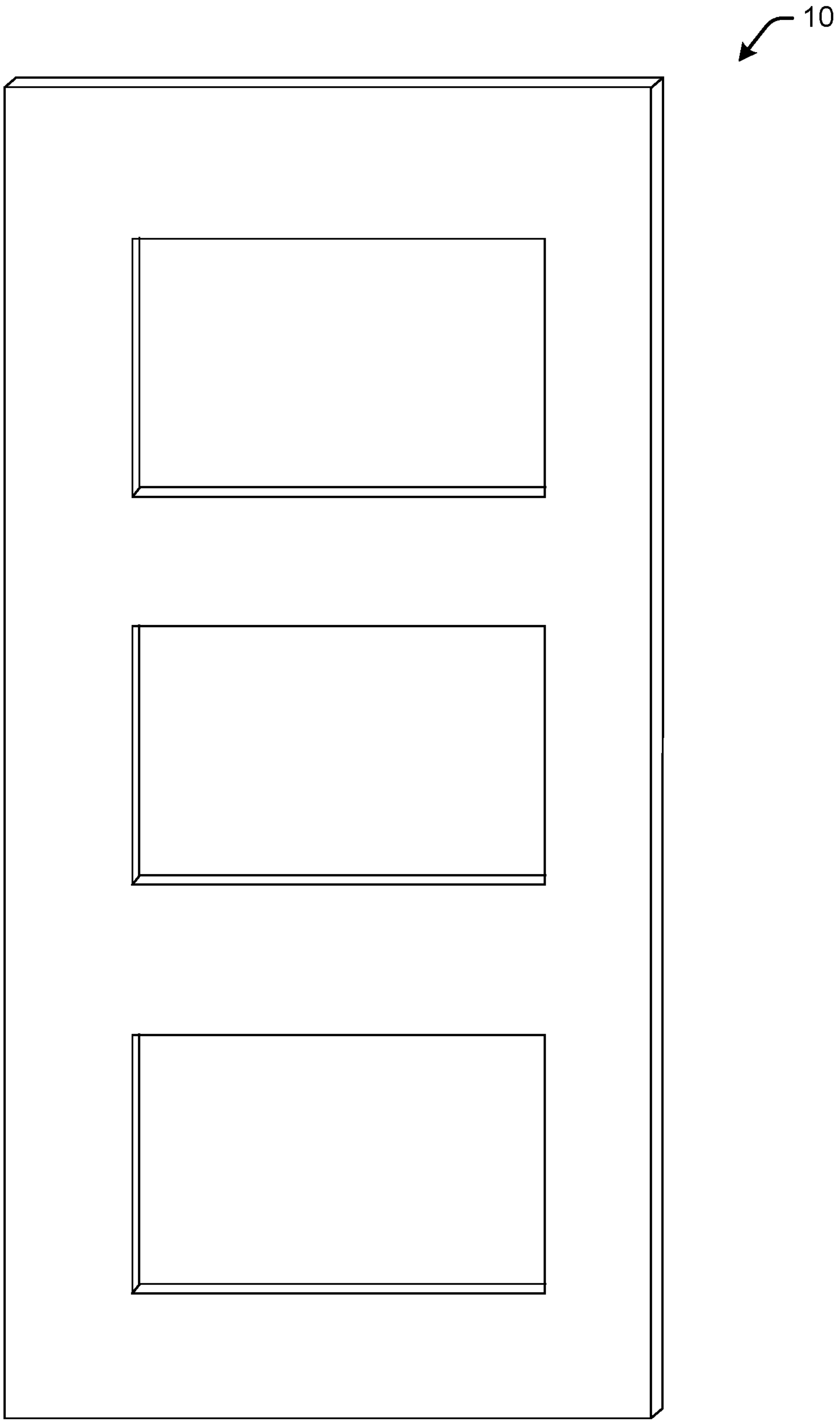

Example operations may also include adding one or more decorative inlay panels 36*a-c*. These panels 36*a-c* are positioned between the mid panel(s) 12, 14 and the outer panels 18, 20, e.g., to cover the openings 16. Additional top trim 40*a-b* and side trim 38*a-b* may be provided adjacent to the decorative inlay panels 36*a-c* to eliminate any gaps, e.g., as shown in FIG. 5.

Example operations may also include assembling a first structural edge 22 adjacent the at least one mid panel 12, 14 to form a first door edge 24 of the manufactured door 10. In an example, the first structural edge 22 may provide support for a door handle.

Example operations may also include assembling a second structural edge 26 adjacent the at least one mid panel 12, 14 to form a second door edge 28 of the manufactured door 10. The second door edge 26 may provide support for door hinges 2*a-c*.

In an example, supports 22 and 26 (e.g., poplar hardwood strips) are positioned along the edges of the panel 12, 14 to increase strength for hinges 2*a-c*, screws, handles 1 and/or other door hardware.

The process may be repeated for both the front and back door segments, and then the front and back door segments may be glued together to form the overall structure of the manufactured door 10. A finished door 10 is shown both the front side 11*a* and the back side 11*b* in FIG. 8. By way of illustration, a routed MDF outer panel may be positioned on top of the routed LDF mid panel(s). Using a press, the panels and then the front and back door segments can be glued together. Both segments or "sides" of the door are glued together and pressed to form the finished door product.

Figure 9:
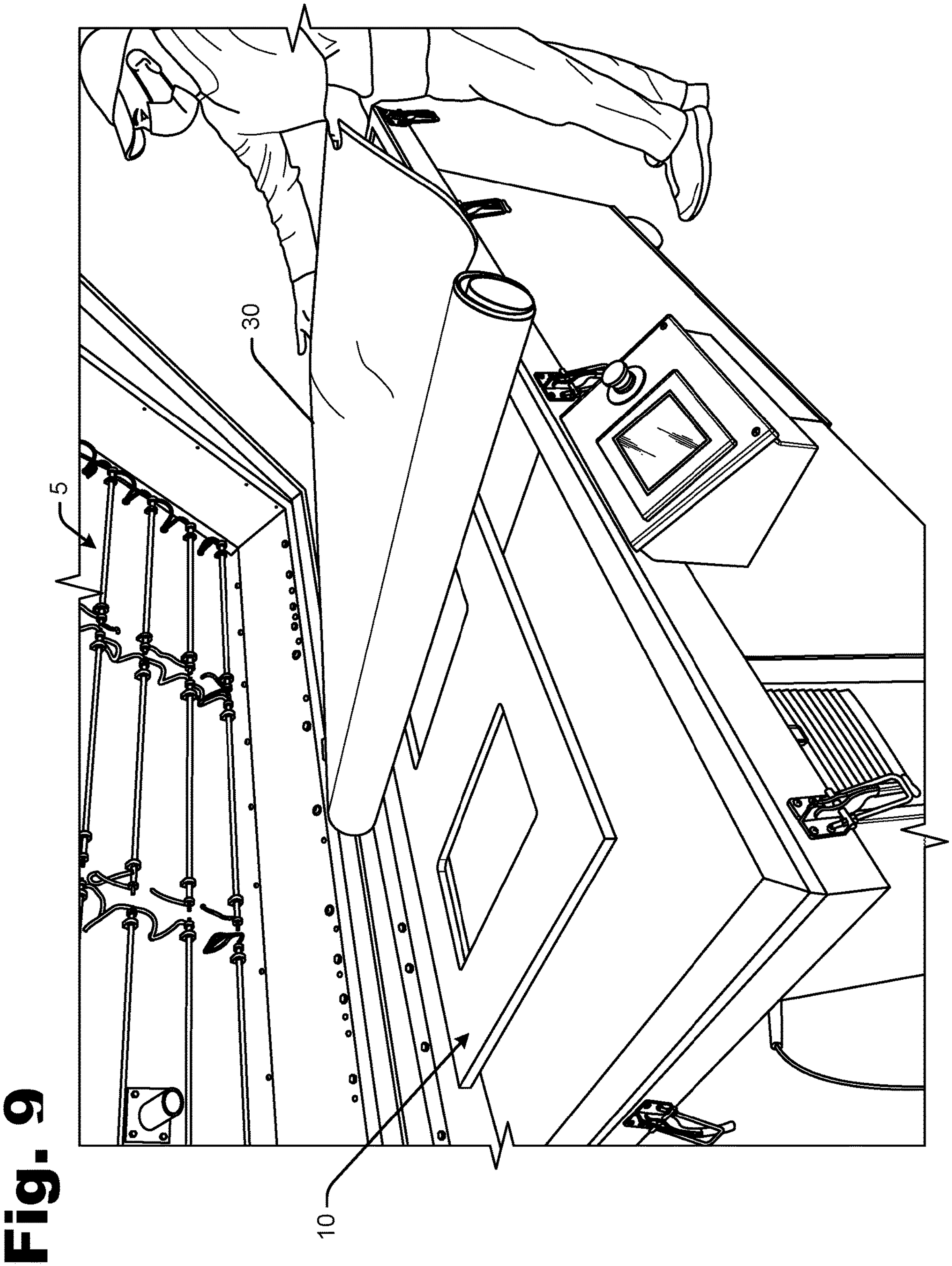
FIG. 9 illustrates application of an example door skin to the manufactured door.

After the door sides are glued together, the finish of choice may be applied. Example operations may also include laminating a door skin on the front outer panel and the back outer panel to finish the manufactured door. FIG. 9 illustrates application of an example door skin 30 to the manufactured door 10. By way of further illustration, a thermally fused foil finish may be applied with a Thermafoil press as a 3DL (three dimensional laminate) finish. In an example, the 3DL finish is made by fusing a layer of a special vinyl to an MDF core using air pressure, suction and heat. The vinyl is formed to the routed surface by heat. Then positive air pressure is applied to create a vacuum. The thermally fused foil finish is adhered using a water-based glue or other suitable adhesive. The result is an extremely durable surface that is more resistant and smoother than paint.

It is noted that the examples shown and described are provided for purposes of illustration and are not intended to be limiting. Still other examples are also contemplated.

The invention claimed is:

1. A manufactured door, comprising:

at least one mid panel having a plurality of openings formed therethrough;

a solid front outer panel assembled over the openings formed through the at least one mid panel to form a front door side, and a solid back outer panel assembled over the openings formed through the at least one mid panel to form a back door side to cover both sides of the plurality of openings formed through the at least one mid panel, the at least one mid panel disposed immediately adjacent to the solid front outer panel or the solid back outer panel;

at least one door panel covering at least some of the plurality of openings formed through the at least one mid panel, the at least one door panel assembled between an opening formed in the solid front outer panel or the solid back outer panel and the at least one mid panel; and a door skin laminated on the solid front outer panel and the solid back outer panel.

2. The manufactured door of claim 1, further comprising a first mid panel and a second mid panel.

3. The manufactured door of claim 2, wherein both the first mid panel and the second mid panel each have a plurality of openings formed therethrough.

4. The manufactured door of claim 3, wherein at least several of the plurality of openings in the first mid panel align with at least several of the plurality of openings in the second mid panel.

5. The manufactured door of claim 3, wherein at least several of the plurality of openings in the first mid panel do not align with at least several of the plurality of openings in the second mid panel.

6. The manufactured door of claim 1, wherein the plurality of openings formed through the at least one mid panel are configured to reduce weight of a finished door product.

7. The manufactured door of claim 1, further comprising at least one structural edge.

8. The manufactured door of claim 7, further comprising a first structural edge forming a first door edge, and a second structural edge forming a second door edge.

9. The manufactured door of claim 7, wherein the at least one structural edge is manufactured of solid wood.

10. The manufactured door of claim 1, wherein the at least one door panel is a solid panel.

11. The manufactured door of claim 1, wherein the plurality of openings formed through the at least one mid panel form a pattern.

12. The manufactured door of claim 1, wherein there are no openings formed through the at least one mid panel within a predetermined surface area designated to mount a door handle.

13. The manufactured door of claim 1, wherein the at least one mid panel is manufactured of low density fiberboard (LDF).

14. The manufactured door of claim 1, wherein the door skin is a thermally fused foil finish.

15. A manufactured door, comprising:

a first mid panel and a second mid panel, at least one of the first mid panel and the second mid panel having a plurality of openings formed therethrough, the plurality of openings reducing weight of a finished door product while maintaining structural integrity of the finished door product;

a front outer panel assembled over the first mid panel to form a front door side, and a back outer panel assembled over the second mid panel to form a back door side, the front outer panel and the back outer panel completely covering both sides of the plurality of openings formed through at least one of the first or second mid panel, the first or second mid panel disposed immediately adjacent to the front outer panel or the back outer panel;

a first structural edge forming a first door edge, and a second structural edge forming a second door edge;

at least one door panel covering at least some of the plurality of openings formed through the first or second mid panel, the at least one door panel assembled between an opening formed in the front outer panel or the back outer panel and the first or second mid panel; and a door skin laminated on the front outer panel and the back outer panel.

16. The manufactured door of claim 15, wherein at least several of the plurality of openings in the first mid panel align with at least several of the plurality of openings in the second mid panel.

17. The manufactured door of claim 15, wherein at least several of the plurality of openings in the first mid panel do not align with at least several of the plurality of openings in the second mid panel.

18. A method of producing a manufactured door, comprising:

forming a plurality of openings through at least one mid panel to reduce weight of the manufactured door, while keeping other areas of the manufactured door solid for strength;

assembling a solid front outer panel over the at least one mid panel to form a front door side of the manufactured door, the solid front outer panel completely covering the plurality of openings formed through the at least one mid panel;

assembling a solid back outer panel over the at least one mid panel to form a back door side of the manufactured door, the solid back outer panel completely covering the plurality of openings formed through at least one mid panel, the mid panel disposed immediately adjacent to the solid front outer panel or the solid back outer panel;

assembling a first structural edge adjacent the at least one mid panel to form a first door edge of the manufactured door, the first structural edge providing support for a door handle;

assembling a second structural edge adjacent the at least one mid panel to form a second door edge of the manufactured door providing support for door hinges;

assembling at least one door panel covering at least some of the plurality of openings formed through the at least one mid panel, the at least one door panel assembled between an opening formed in the solid front outer panel or the solid back outer panel and the at least one mid panel; and laminating a door skin on the solid front outer panel and the solid back outer panel to finish the manufactured door.

* * * * *